United States Patent
Cheikh et al.

(10) Patent No.: US 12,441,274 B2
(45) Date of Patent: Oct. 14, 2025

(54) METHOD FOR ACTIVATING A VEHICLE FUNCTION AND ASSOCIATED ACTIVATION DEVICE

(71) Applicant: Continental Automotive Technologies GmbH, Hannover (DE)

(72) Inventors: Mohamed Cheikh, Toulouse (FR); Sébastien Chanal, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 133 days.

(21) Appl. No.: 18/229,859

(22) Filed: Aug. 3, 2023

(65) Prior Publication Data
US 2024/0042963 A1  Feb. 8, 2024

(30) Foreign Application Priority Data
Aug. 5, 2022 (FR) ........................... 2208147

(51) Int. Cl.
| | | |
|---|---|---|
| B60R 25/24 | (2013.01) | |
| G01S 3/04 | (2006.01) | |
| G01S 11/02 | (2010.01) | |
| H04B 1/7163 | (2011.01) | |

(52) U.S. Cl.
CPC .............. B60R 25/245 (2013.01); G01S 3/04 (2013.01); G01S 11/02 (2013.01);
(Continued)

(58) Field of Classification Search
CPC ....... B60R 25/245; B60R 25/20; B60R 25/24; B60R 2325/101; B60R 2325/205;
(Continued)

(56) References Cited

U.S. PATENT DOCUMENTS

| | | | |
|---|---|---|---|
| 10,748,361 B1 * | 8/2020 | Zhu ..................... | G07C 9/00309 |
| 2016/0075307 A1 * | 3/2016 | Jakobsson ............... | B60R 25/31 |
| | | | 701/2 |

(Continued)

OTHER PUBLICATIONS

Jiang, C. et al., "UWB NLOS/LOS Classification using Deep Learning Method", IEEE Communications Letters, Oct. 2020, vol. 24(10), pp. 2226-2230.

(Continued)

*Primary Examiner* — Ryan W Sherwin
(74) *Attorney, Agent, or Firm* — Buchanan Ingersoll & Rooney PC (57) ABSTRACT

A method for activating a vehicle function, by an activation device including a transceiver to communicate with "hands-free" access equipment. The transceiver is equipped with a gyroscope and a magnetometer and two receiving antennas that have a coefficient of electromagnetic coupling between them that is below a threshold. The method includes the following steps for at least two consecutive footsteps: transmission of a signal comprising data of the gyroscope and the magnetometer of the "hands-free" equipment to the vehicle; comparison of the data with representative values of the gyroscope and the magnetometer of the transceiver; determination of a first direction of the user; determination of a second direction of the user based on an estimation of a first angle of arrival of the signal towards the transceiver; comparison of the first direction and the second direction; activation of the vehicle function on the basis of the result of the comparison.

12 Claims, 5 Drawing Sheets

(52) U.S. Cl.
CPC .................. *H04B 1/71632* (2013.01); *H04B 2201/71632* (2013.01); *H04B 2201/71634* (2013.01)

(58) Field of Classification Search
CPC . G01S 3/04; G01S 11/02; G01S 13/86; G01S 2013/462; G01S 5/0218; G01S 13/765; G01S 2205/01; G01S 5/0284; H04B 1/71632; H04B 2201/71632; H04B 2201/71634; G07C 9/00309; G07C 2209/63
See application file for complete search history.

(56) References Cited

U.S. PATENT DOCUMENTS

| | | |
|---|---|---|
| 2017/0289753 A1 | 10/2017 | Mahasenan et al. |
| 2018/0213355 A1* | 7/2018 | Smith .................. G01S 13/765 |
| 2020/0014099 A1 | 1/2020 | Ghabra et al. |
| 2020/0262390 A1* | 8/2020 | Abou-Chahine .... G01C 21/166 |
| 2020/0269809 A1 | 8/2020 | Sanji et al. |
| 2022/0236363 A1* | 7/2022 | Vaccariello ........... G01S 5/0284 |
| 2023/0067130 A1* | 3/2023 | Duan ................ H04W 72/0453 |

OTHER PUBLICATIONS

Xu, H. et al., "LoS/NLoS Identification Based on Double-Polarized Antenna and Convolutional Neural Networks", CEUR Workshop Proceedings (CEUR-WS.org), IPIN 2021 WiP Proceedings, Nov. 29-Dec. 2, 2021, CEUR-WS.org/Vol-3097/paper33.pdf, 13 pages.

French Search Report for French Application No. 2208147, dated Mar. 22, 2023 with translation, 13 pages.

* cited by examiner

METHOD FOR ACTIVATING A VEHICLE FUNCTION AND ASSOCIATED ACTIVATION DEVICE

CROSS REFERENCE TO RELATED APPLICATIONS

This application claims priority to French Patent Application No. 2208147, filed Aug. 5, 2022, the contents of such application being incorporated by reference herein.

FIELD OF THE INVENTION

The invention relates to a method for activating a function of a motor vehicle and an associated activation device. The invention applies particularly but entirely non-limitingly to the function of hands-free access to a motor vehicle, that is to say to the function of locking and unlocking the opening elements of a motor vehicle.

BACKGROUND OF THE INVENTION

In a motor vehicle, it is known practice to use vehicle function activation devices that can detect the presence of a hand or of a foot of a user of the vehicle and thus to make it possible to lock or unlock all or some of the opening elements of the vehicle, for example the doors or the trunk. By way of example, the detection of the presence of a hand of a user on or in front of a door handle in conjunction with the recognition of an identifier of "hands-free" access equipment carried by this user makes it possible to lock and unlock these opening elements.

What is referred to as a "hands-free" access system for accessing a motor vehicle makes it possible for an authorized user to lock and/or unlock the opening elements of his vehicle without having to physically press buttons on a key. For this purpose, the vehicle identifies portable equipment such as a fob or remote control or even a key carried by the user and, if the fob or the remote control or indeed the key is situated in a predetermined zone around the vehicle or in the vehicle and is identified as belonging to the vehicle, then the vehicle automatically locks/unlocks its opening elements according to the intention of the user, without the user having to physically manipulate a key.

To achieve this, when the user approaches the vehicle, communication is established over a wireless communication link between the "hands-free" access equipment, for example an electronic fob or a smartphone, and the vehicle function activation device in order to authenticate said access equipment by virtue of its identifier.

To this end, the activation device comprises at least one radiofrequency antenna making it possible to receive the identifier sent by the "hands-free" access equipment. The activation device is connected to an electronic computer of the vehicle ("ECU": abbreviation for "electronic control unit"), to which it transmits the identifier.

According to the prior art, the access equipment is generally an electronic fob. The signal received by the antenna of the activation device, comprising the identifier of the access equipment, is transmitted via RF (radiofrequency) or LF (low-frequency) waves. The precise location of the portable equipment around the vehicle is found by measuring the strength of the LF signal received by the portable equipment (via the antennas and the electronic control unit) from the vehicle, more commonly called RSSI (received signal strength indication) measurements. The measurement of the power of each signal received by the portable equipment from each antenna of the plurality of LF antennas situated on the vehicle V is received and analyzed by an activation device, installed in the vehicle, which thus determines, using triangulation, the position of the portable equipment with respect to said LF antennas, i.e. with respect to the vehicle.

According to the location of the portable equipment identified by the vehicle, in said location zones, certain actions which are specific to said location zones are performed automatically: unlocking/locking or preliminarily turning on the lighting in the passenger compartment (also called "welcome lighting").

Nowadays, however, it is increasingly common to use a cell phone to perform authentication functions, thus making it possible to avoid using a dedicated electronic fob and thus to limit the number of items of equipment. The majority of cell phones do not possess RF or LF communication means. It therefore becomes necessary to adapt the "hands-free" start-up and/or access system for a vehicle in order for it to be able also to function with a cell phone equipped with other communication standards, such as, for example, ultra-wideband, or BLE (Bluetooth Low Energy®), or Wi-Fi (Wireless Fidelity) communication and no longer only using radio and low-frequency (RF and LF) waves. Ultra-wideband (UWB), in particular, is a radio modulation technique which is based on transmitting pulses of a very short duration, often less than a nanosecond. Thus, the passband may reach very large values.

The access equipment coming into proximity of (less than 2 m away from) the activation device and the identifier received by the computer being recognized, in conjunction with the hand of the user being detected, allows the door to be locked or unlocked.

The disadvantage of using UWB communication means is the precision of location of the access equipment (cell phone or fob), which is worse compared to when low-frequency 125-kHz communication means of the prior art are used.

This is because ultra-wideband is more sensitive to reflections and interference. Thus, precise location requires the vehicle to be equipped with between six and eight UWB transceivers (four to six on the outside of the vehicle and two inside the vehicle) so that three UWB transceivers are always visible to the access equipment, whereas at low frequency, according to the prior art, a single visible transceiver is able to precisely locate the access equipment, and the vehicle is generally equipped with three external antennas and two internal antennas for the same location precision.

The consequence of this increase in the number of UWB transceivers on the vehicle is an additional cost of the activation device, which is undesirable.

Moreover, what are referred to as "indirect" UWB signals between the access equipment and the vehicle, i.e. those that have been reflected by a wall, sometimes have a power equal to that of what are referred to as "direct" signals, i.e. those that have not encountered any obstacle on their trajectory.

Conversely, UWB signals that are referred to as "direct" but have in some cases been absorbed by the human body, which is on their trajectory, have a power that is below or equal to that of what are referred to as indirect signals.

Since the location of the access equipment is determined based on the power of the signal received by the activation device, it will be understood that location by UWB signals cannot be precise.

The disadvantage for the user is considerable because certain functions will not be activated, for example automatic "hands-free" unlocking or automatic "hands-free" locking of the vehicle when the user enters the unlocking or locking zone.

An aspect of the invention therefore proposes a vehicle function activation method and an associated activation device that overcome the disadvantages of the prior art, more particularly that allow reliable and precise location of the access equipment.

SUMMARY OF THE INVENTION

An aspect of the invention proposes a method for activating a vehicle function, by way of an activation device that is intended to be installed in a vehicle and comprises at least one transceiver capable of using ultra-high frequency to communicate with "hands-free" access equipment carried by a user, said equipment being equipped with a magnetometer and a gyroscope, the activation of the function being triggered by detection of the presence of the user in a predetermined area around the vehicle and on the basis of a result of authentication of the "hands-free" access equipment by the vehicle, the method being noteworthy in that the transceiver is first equipped with a gyroscope and a magnetometer and two receiving antennas that have a coefficient of electromagnetic coupling between them that is below a threshold, and in that said method comprises the following steps with each footstep of the user and for at least two consecutive footsteps:
  a) ultra-high frequency transmission of a signal comprising representative data of the gyroscope and the magnetometer of the "hands-free" equipment to the vehicle,
  b) comparison of said received data with representative values of the gyroscope and the magnetometer of the transceiver,
  c) determination of a first direction of the user between the two footsteps towards the transceiver on the basis of said comparison,
  d) determination of a second direction of the user between the two footsteps, based on an estimation of a first angle of arrival of said signal towards the transceiver through calculation of a phase shift of the received signal between the two antennas, and of a distance between the access equipment and the transmitter,
  e) comparison of the first direction and the second direction,
  f) activation of the vehicle function on the basis of the result of said comparison.

In a second embodiment, the method comprises the following steps after the step of determination of a second direction:
  a) calculation of a second angle of arrival for each footstep based on the data of the portable equipment and based on the distance between the access equipment and the transmitter,
  b) comparison of said second angle and the first angle,
  c) activation of the vehicle function on the basis of the result of said comparison.

Advantageously, if the result of the comparison of the first angle and the second angle ($\Delta\varphi$) or of the first direction and the second direction ($\Delta DIR$) is:
  a) above a first predetermined angle, then no function is activated,
  b) below a second predetermined angle, which is below the first predetermined angle, then a security function is activated,
  c) between the second predetermined angle and a third predetermined angle, then a comfort function is activated,
  d) between the third predetermined angle and the second predetermined angle, then the method is repeated and the values of the first angle and the second angle or of the first direction and the second direction are stored.

An aspect of the invention also relates to an activation device for activating a vehicle function, which device is intended to be installed in a vehicle and comprises at least one transceiver capable of using ultra-high frequency to communicate with "hands-free" access equipment carried by a user, the access equipment being equipped with a magnetometer and a gyroscope, the activation of the function being triggered by detection of the presence of the user in a predetermined zone around the vehicle and on the basis of a result of authentication of the "hands-free" access equipment by the vehicle, said device being noteworthy in that the transceiver comprises a gyroscope and a magnetometer and two receiving antennas that have a coefficient of electromagnetic coupling between them that is below a threshold, and in that the device is capable of:
  a) using ultra-high frequency to receive representative data of the gyroscope and the magnetometer from the "hands-free" equipment,
  b) comparing said data with representative values of the gyroscope and the magnetometer of the transceiver,
  c) determining a first direction of the user on the basis of said comparison,
  d) determining a second direction of the user, based on an estimation of a first angle of arrival of said signal towards the transceiver through calculation of a phase shift of the received signal between the two antennas and of a distance between the access equipment and the transmitter,
  e) comparing the first direction and the second direction,
  f) activating the vehicle function on the basis of the result of said comparison.

In the second embodiment, the activation device is capable of:
  a) calculating a second angle of arrival based on the data of the portable equipment and based on the distance between the access equipment and the transmitter,
  b) comparing said second angle and the first angle,
  c) activating the vehicle function on the basis of the result of said comparison.

An aspect of the invention also applies to "hands-free" access equipment carried by a user, capable of using ultra-high frequency to communicate with an activation device for activating a vehicle function, which device is intended to be installed on a motor vehicle, the equipment being equipped with a gyroscope and a magnetometer; the activation of the function being triggered by detection of the presence of the user in a predetermined zone around the vehicle and on the basis of a result of authentication of the "hands-free" access equipment by the vehicle, the "hands-free" access equipment being noteworthy in that it is capable of using ultra-high frequency to transmit a signal comprising representative data of the gyroscope and the magnetometer to the vehicle with each footstep, and for at least two consecutive footsteps, of the user.

An aspect of the invention applies to an activation system for activating a vehicle function, comprising an activation device and portable access equipment according to any one of the preceding embodiments.

An aspect of the invention can be applied to any computer program product comprising program code instructions for executing the steps of the method according to any one of the features listed above when said program is executed on a computer.

Finally, an aspect of the invention relates to any motor vehicle comprising an activation device according to any of the features listed above.

BRIEF DESCRIPTION OF THE DRAWINGS

Other features and advantages of aspects of the invention will become more apparent upon reading the description that follows. This description is purely illustrative and should be read with reference to the appended drawings, in which.

DETAILED DESCRIPTION OF THE PREFERRED EMBODIMENTS

Figure 1:
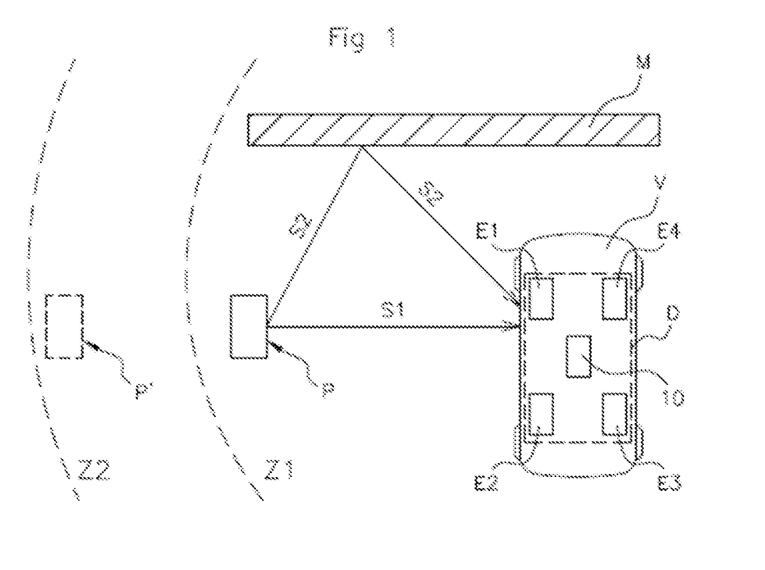
FIG. 1 schematically shows hands-free access equipment sending two signals to a vehicle, what is referred to as a "direct" signal S1 and what is referred to as an "indirect" signal S2, FIG. 2 schematically shows a user furnished with hands-free access equipment in a predetermined zone around the vehicle equipped with the activation device according to an aspect of the invention, FIG. 3 schematically shows the vehicle comprising the installed activation device, and the hands-free access equipment in the case of an exchange of direct and indirect signals between said equipment and said device, FIG. 4 schematically shows the activation system according to an aspect of the invention, comprising the hands-free access equipment and the activation device installed on the vehicle.

FIG. 1 shows "hands-free" access equipment P in a predetermined zone Z1 around a vehicle V, and a motor vehicle V. The access equipment P and the vehicle V are capable of communicating with one another by communicating using ultra-high frequency, for example using BLE, at 2.4 GHz, or for example using WiFi, or using ultra-wideband UWB. To this end, the vehicle V has multiple transceivers E1, E2, E3, E4 situated on its bodywork or in its passenger compartment, which transceivers are each provided with at least two antennas, which are decoupled from one another, and with ultra-high frequency bidirectional communication means. An aspect of the invention works with at least one transceiver E1 that is present on the vehicle V.

The "hands-free" access equipment P can be for example a tablet or a smartphone that, as already explained, can be used to activate what are referred to as security functions such as unlocking or locking the doors of the vehicle V or triggering what are referred to as comfort functions, such as for example switching on welcome lighting inside or outside the vehicle, or adjusting the height of the seats without the user having to operate a handle on his vehicle, and without the user having to touch his vehicle.

The access equipment P is furnished with a gyroscope G0 and a magnetometer M0, as is known per se.

The activation of the security or comfort functions is dependent on the location of the access equipment P in relation to the vehicle V.

Figure 2:
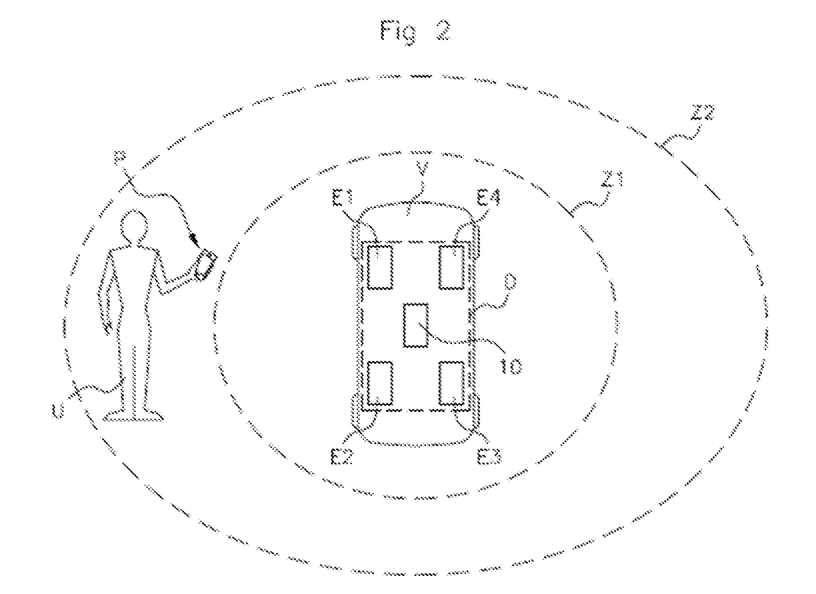

To activate the security functions, the access equipment P and therefore the user U must be within a first proximate zone around the vehicle Z1 (cf. FIG. 2). On the other hand, to activate comfort functions, the access equipment P can be in a second, more remote zone Z2 around the vehicle V (cf. FIG. 2).

The location of the access equipment P in the first Z1 or second Z2 zone is determined by measuring the strength or the time of flight of the ultra-wideband signal sent by the access equipment P and received by the vehicle V.

However, the strength or the time of flight of the UWB signal received by the vehicle can vary greatly depending on the environment that the access equipment P is in.

When there is a direct path S1 (cf. FIG. 1), also called "LOS" or "line of sight", between the access equipment P and the vehicle V, the UWB signal does not meet any obstacles, and the strength of the received signal measured by the vehicle is reliable, and therefore so too is the determination of the location of the portable equipment P (cf. FIG. 1). In FIG. 1, based on the received UWB signal S1, the access equipment P is correctly located as being in the first zone Z1 around the vehicle V.

When there is an indirect path S2 (cf. FIG. 1), also called "NLOS" or "non-line of sight", between the access equipment P and the vehicle V, the UWB signal is reflected by a wall M on its trajectory, for example. The strength of the received signal is then greatly decreased or the time of flight is increased and the access equipment is located as being further away than it actually is by the vehicle. The access equipment P' is then located as being in the second zone Z2, which is more remote, whereas it is actually in the first zone Z1.

The disadvantage for the user U is considerable because, when the location is erroneous in this way, he is no longer able to either unlock or lock his vehicle because his equipment is incorrectly located as being in the second zone Z2.

An aspect of the invention proposes a method, a device D and an activation system SYS that overcome these disadvantages of the prior art.

The activation system SYS comprises the activation device D and the access equipment P.

To this end, the access equipment P is capable of sending to the vehicle V, using ultra-high frequency communication, for example using BLE at 2.4 GHz, a signal comprising representative measurements of its gyroscope G0 and its magnetometer M0.

Figure 4:
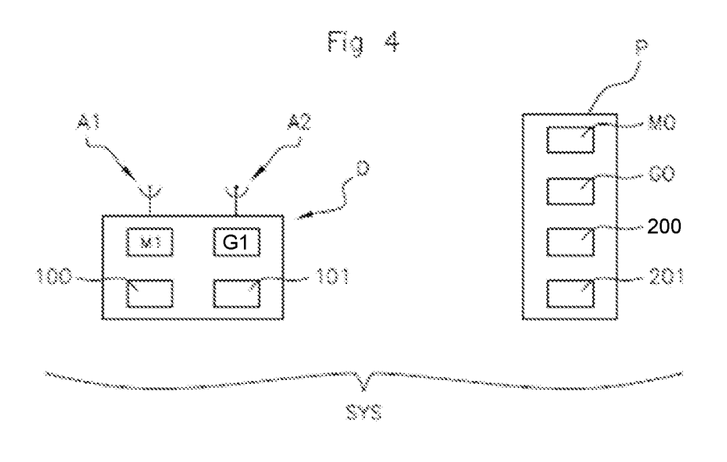

To this end, the access equipment P comprises a processor 200 and a memory 201 (cf. FIG. 4) that stores instructions that can be used to configure the processor to execute certain special processing operations, in particular to implement the steps of the activation method according to the embodiments as described below.

Representative measurements are understood to mean either raw measurements of the magnetometer M0 and the gyroscope G0 or measurements derived from these two sensors. For example, the access equipment can process the data from the magnetometer M0 and the gyroscope G0 (number of footsteps, direction in relation to magnetic north, and so on) and deduce therefrom its direction of movement in relation to magnetic north, which it then sends to the vehicle V in an ultra-high frequency signal.

An aspect of the invention proposes also equipping the transceiver E1 of the activation device D with a gyroscope G1 and a magnetometer M1, and two receiving antennas A1, A2 (cf. FIGS. 3 and 4) that have a coefficient of electromagnetic coupling between them that is below a threshold, for example below 0.7. In other words, the two antennas A1, A2 are located as being in the same place, in the transceiver E1, and are weakly electromagnetically coupled to one another.

In a first embodiment of the invention, the activation device D, for its part, is capable of:
a) using ultra-high frequency to receive the signal from the access equipment P comprising the representative data of the gyroscope G0 and the magnetometer M0,
b) comparing said data G0, M0 with representative values of the gyroscope G1 and the magnetometer M1 of the transmitter E1, and
c) determining a first direction DIR1 of the user in relation to the transceiver E1 on the basis of said comparison,
d) determining a second direction DIR2 of the user based on an estimation of a first angle of arrival φ0, φ1 of said signal towards the transceiver E1 through calculation of a phase shift of the received signal between the two antennas A1, A2 and of a distance RF0, RF1 between the portable equipment P and the transmitter E1,
e) comparing the first direction DIR1 and the second direction DIR2,
f) activating the vehicle function on the basis of the result of said comparison.

In a second embodiment of the invention, the activation device D is capable of:
a) using ultra-high frequency to receive the signal from the access equipment P comprising the representative data of the gyroscope G0 and the magnetometer M0,
b) estimating a first angle of arrival φ0, φ1 of said signal towards the transceiver through calculation of a phase shift of the received signal between the two antennas A1, A2, and of a distance RF0, RF1 between the access equipment P and the transmitter E1,
c) comparing said data G0, M0 with representative values of the gyroscope G1 and the magnetometer M1 of the transmitter E1, and
d) calculating a second angle of arrival φ0', φ1' based on the data of the portable equipment P and based on a distance RF0, RF1 between the access equipment P and the transmitter E1,
e) comparing said second angle φ1' with the first angle φ1,
f) and activating the vehicle function on the basis of the result of said comparison.

To this end, the activation device D comprises a processor 100 and a memory 101 (cf. FIG. 4) that stores instructions that can be used to configure the processor to execute certain special processing operations, in particular to implement the steps of the activation method according to the embodiment as described below.

Figure 3:
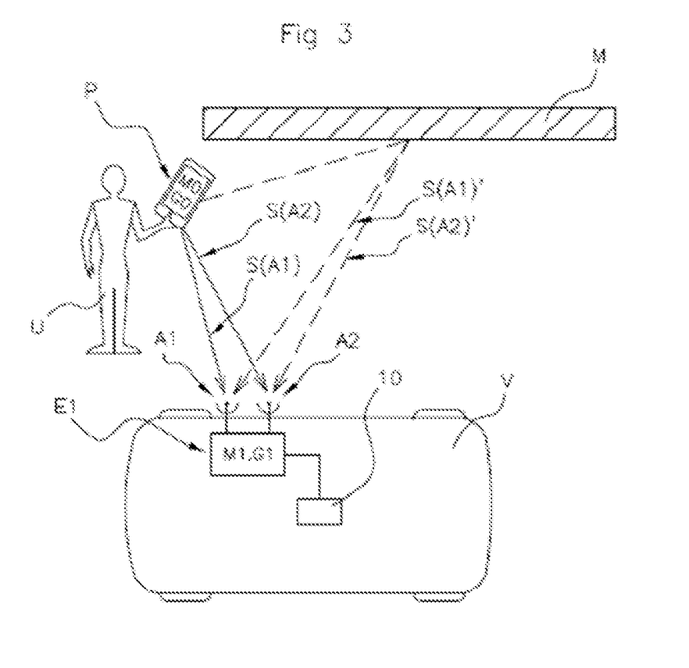

The processor 100 and the memory 101 can be included in the transceiver E1, or alternatively the processor 100 and the memory 101 can be remote and included in a central management unit 10, which is installed in the vehicle V and electronically connected to the transceiver E1 (cf. FIG. 3).

Figure 5:
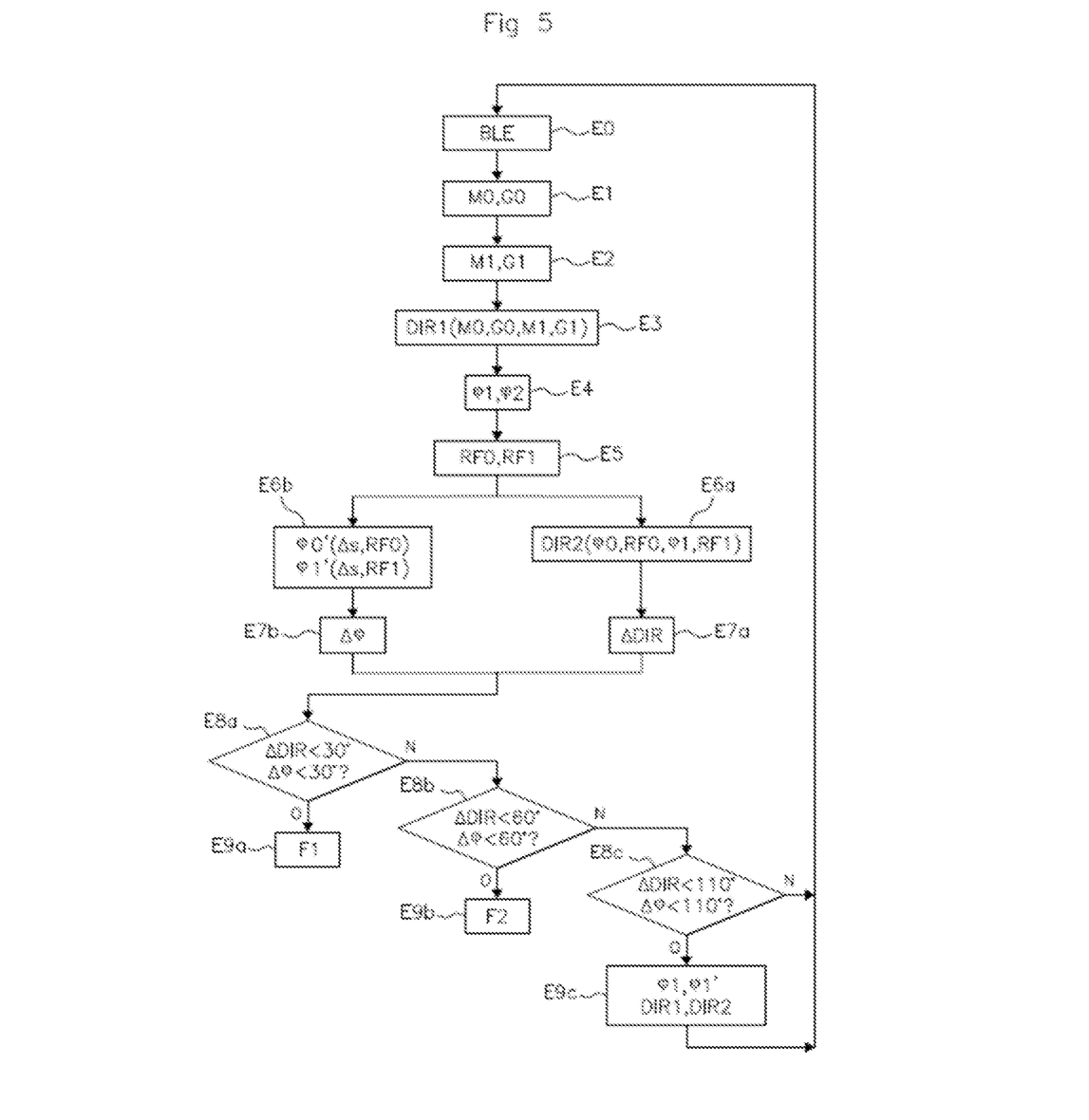
FIG. 5 is a flowchart illustrating the activation method according to an aspect of the invention.
Figure 6:
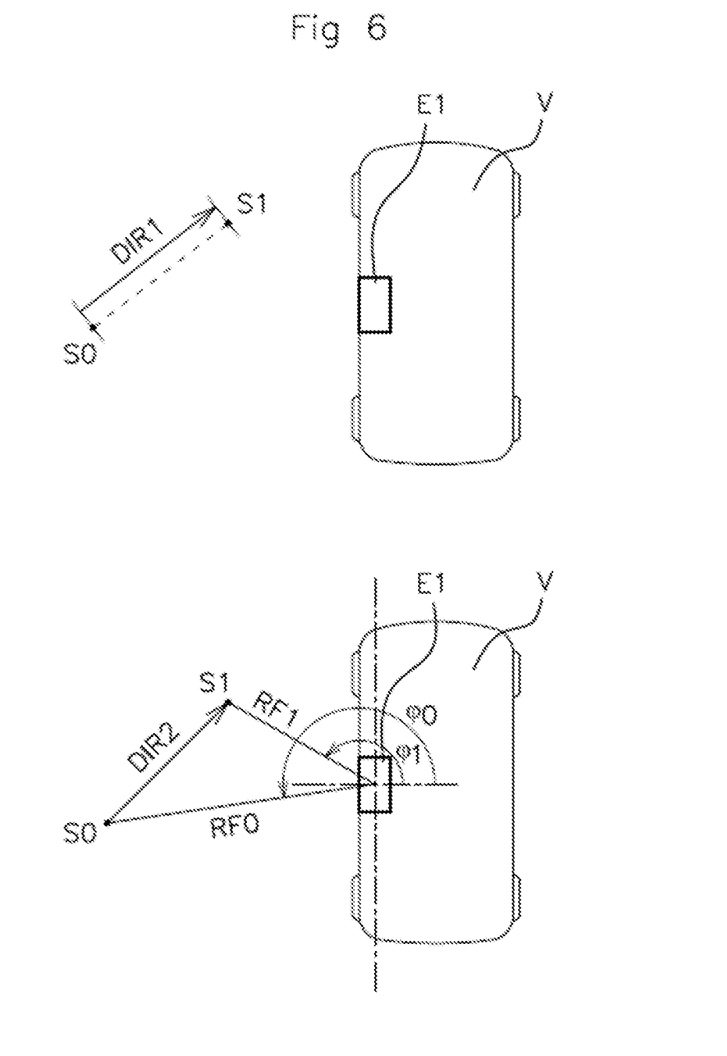
FIG. 6 shows the first direction of the user in the top figure and the second direction of the user in the bottom figure, said directions being determined according to the first embodiment of the invention.

The method for activating a vehicle function, according to an aspect of the invention and illustrated in FIG. 5, will now be described.

In a first step E0, at least one transceiver E1 of the activation device D is equipped with a gyroscope G0, a magnetometer M0 and two receiving antennas A1, A2 (cf. FIGS. 3 and 4) that have a coefficient of electromagnetic coupling between them that is below a threshold. In this step E0, the portable equipment P and the activation device DC are equipped with communication means for communicating with one another using ultra-high-frequency, for example but nonlimitingly using BLE. The portable equipment P has an integrated magnetometer M0 and gyroscope G0 in a manner known per se and takes frequent or recurrent measurements using these two sensors.

In the next step E1, the portable access equipment P sends a signal S comprising representative data of the measurements from its gyroscope G0 and from its magnetometer M0 to the vehicle V with each footstep of the user and for at least two consecutive footsteps, S0, S1. These data can be raw data or data processed by the equipment P that can be used to determine the direction of movement of the access equipment P in relation to magnetic north.

This method of determining movement is known by those skilled in the art and is called "pedestrian dead reckoning" or "dead reckoning navigation system", which can be used to estimate a trajectory courtesy of a magnetometer and a gyroscope without using a more precise geopositioning system.

Once the data G0, M0 have been received by the transceiver E1, the latter compares them with the values from its gyroscope G1 and from its magnetometer M1 (step E2), which indicate the fixed position of the transmitter E1 in relation to magnetic north.

It is thus possible, based on these two sets of measurements (G0, M0) and (G1, M1), to determine the direction of movement $\overrightarrow{DIR1}$ (step E3), in the form of a vector, of the access equipment P in relation to the transmitter E1 between the two footsteps S0, S1. This is illustrated in FIG. 1.

In a first embodiment of the invention, in the next step, E4, the ultra-high frequency signal transmitted by the access equipment P is then received by the two antennas A1, A2 of the transmitter E1. As the two antennas A1, A2 are electromagnetically decoupled, they each receive the signal with a different phase. An aspect of the invention proposes determining a phase shift Δθ (step E4) between the signals received by each of the two antennas A1, A2, thus making it possible to calculate an angle of arrival φ0, φ1 of the signal from the portable equipment P to the transmitter E1 for each footstep.

The transceiver E1 also determines (step E5) for each footstep the distance RF0, RF1 that separates it from the portable equipment P. Based on the distance values RF0, RF1 and the angle of arrival values φ0, φ1, the transmitter E1 can thus calculate a second direction $\overrightarrow{DIR2}$ of the user, in the form of a vector, between the two footsteps S0, S1 (step E6a).

Determination of the phase shift Δθ between two antennas A1, A2 is known to those skilled in the art; several algorithms exist to this end, for example the "MUSIC", or "Multiple signal classification", algorithm. This signal processing algorithm can be used to determine an angle of arrival in relation to a receiver, here the transceiver E1, courtesy of two decoupled antennas, A1, A2. Thus, two decoupled antennas can be used to cover an angle between 0° and 180° and three decoupled antennas can be used to cover an angle from 0° to 360°. This is known to those skilled in the art.

The phase shift can thus be used to determine a first angle of arrival φ0, φ1 of the ultra-high frequency signal in relation to the transmitter E1.

In the next step (step E7a), the method according to an aspect of the invention aptly proposes checking the consistency between the first direction $\overrightarrow{DIR1}$ calculated using the data of the gyroscope and the magnetometer of the portable equipment P and the second direction $\overrightarrow{DIR2}$ determined courtesy of the angle of arrival of the RF signal and the estimated distance RF0, RF1 between the transmitter E1 and the portable equipment P.

The consistency check is performed by comparing the two vectors, either by way of a difference or by way of a quotient. In this example, we will use the difference.

In this particular case, the method proposes performing the following calculation (step E6a):

$$\Delta DIR = \overrightarrow{DIR2} - \overrightarrow{DIR1} \qquad [\text{Math 1}]$$

Depending on the result of the comparison, it is then possible to activate certain vehicle functions, as described below.

According to a second embodiment of the invention, it is proposed that a second angle of arrival, calculated based on the data of the portable equipment and the distance RF0, RF1 estimated by the transmitter, be determined after step E5.

Figure 7:
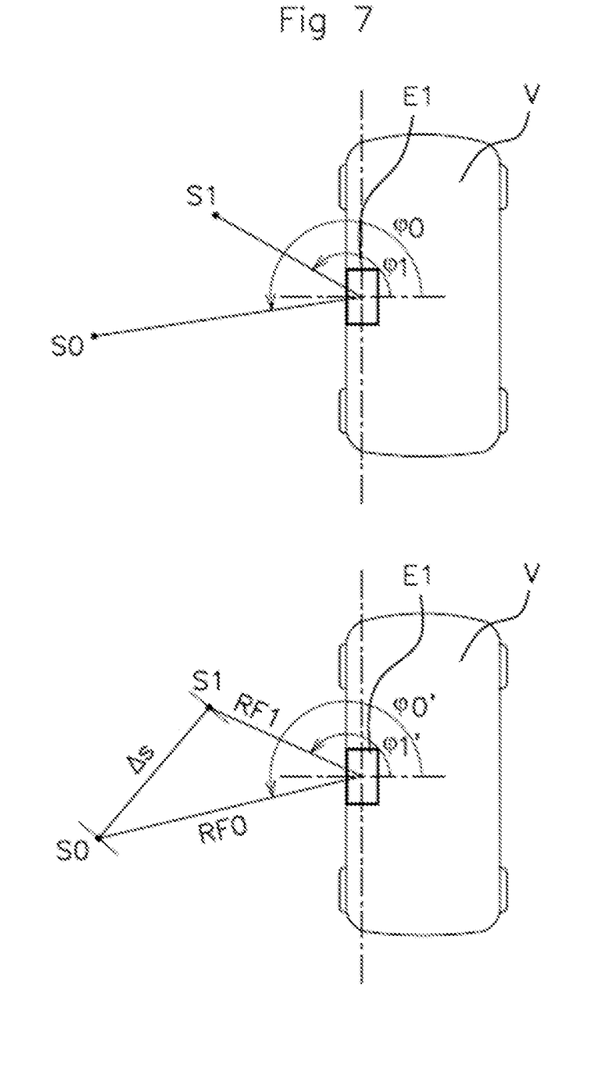
FIG. 7 shows the first angle of arrival in the top figure and the second angle of arrival in the bottom figure for the signal from the portable equipment according to the second embodiment of the invention.

The data of the portable equipment coming from the gyroscope G0 and the magnetometer M0 can be used to estimate a distance $\Delta s$ travelled between the two footsteps S0, S1 (cf. bottom of FIG. 7). As the distances RF0 and RF1 between the two positions of the portable equipment P, or the footsteps S0 and 51, and the transmitter E1 are known, the points S0, S1 and the position of the transmitter E1 form some kind of triangle, and it is possible to determine (step E6b) a second angle of arrival $\varphi 0'$, $\varphi 1'$ of the signal towards the transmitter E1 (cf. FIG. 7) for each position of the equipment, i.e. for each footstep of the user.

It is then proposed that this second angle $\varphi 1'$, determined courtesy of the distance RF0, RF1 estimated by the transmitter E1 and the data of the portable equipment P, be compared with the first angle $\varphi 1$ determined solely by the transmitter E1 (step E7b).

The consistency check is performed by comparing the two values, either by way of a difference or by way of a quotient. In this example, we will use the difference.

In this particular case, the method proposes performing the following calculation (step E7a):

$$\Delta \varphi = \varphi 2 - \varphi 1 \qquad [\text{Math 2}]$$

Once the calculation has been performed, the angle difference $\Delta \varphi$ or the direction difference $\Delta DIR$ is then compared with multiple predetermined angle values:

a) If the difference is greater than a first predetermined angle, for example equal to 110° (step E8c), the signal is considered to have had an indirect trajectory and the location of the access equipment in one of the predetermined zones around the vehicle V is considered not to be able to be determined precisely; in this case, no function is activated, and the method starts again from the beginning, b) If the difference is less than a second predetermined angle, for example equal to 30° (step E8a), then the signal is considered to have had a direct trajectory, the location of the access equipment is therefore considered to be able to be determined very precisely and the functions characteristic of the predetermined zone in which the access equipment is situated are considered to be able to be activated, in this particular case the security functions F1 are considered to be able to be activated (step E9a), if the access equipment is indeed situated in the zone Z1 close to the vehicle V, c) If the difference is between the second predetermined angle 30° and a third predetermined angle 60°, which is greater than the second (step E8b), then the signal is considered to have had a more or less direct trajectory, the location of the access equipment is therefore considered to be able to be determined satisfactorily precisely, but only what are referred to as comfort functions F2 are considered to be able to be activated (step E9b), the location precision being insufficient to activate what are referred to as security functions F1, d) Finally, if the difference is between the third (60°) and first (110°) predetermined angles, the signal is considered to have had an indirect trajectory, and no function is activated, the method can start again from the beginning, but the angle of arrival values or the direction values, the first and second angles $\varphi 1$, $\varphi 1'$, the first $\overrightarrow{DIR1}$ and second $\overrightarrow{DIR2}$ directions, can also be stored (step E9c) in order to average them with subsequent angle of arrival or direction measurements and thus continually improve the precision of location of the access equipment.

The An aspect of the invention is therefore apt because it allows direct signal paths to be distinguished from indirect paths and thus only the direct signal paths to be used to precisely determine the location of the access equipment.

An aspect of the invention is all the more ingenious because it requires only the addition of a magnetometer, a gyroscope and two antennas to a transceiver of the vehicle, the activation method predominantly consisting of software calculations.

The invention claimed is:

1. A method for activating a vehicle function, by way of an activation device that is intended to be installed in a vehicle and comprises at least one transceiver capable of using ultra-high frequency to communicate with "hands-free" access equipment carried by a user, said equipment being equipped with a magnetometer and a gyroscope, the activation of the function being triggered by detection of the presence of the user in a predetermined zone around the vehicle and on the basis of a result of authentication of the "hands-free" access equipment by the vehicle, wherein the at least one transceiver is first equipped with a gyroscope and a magnetometer and two receiving antennas that have a coefficient of electromagnetic coupling between them that is below a threshold, and wherein said method comprises the following steps with each footstep of the user and for at least two consecutive footsteps:

a) ultra-high frequency transmission of a signal comprising representative data of the gyroscope and the magnetometer of the "hands-free" access equipment to the vehicle, b) comparison of received data with representative values of the gyroscope and the magnetometer of the at least one transceiver, c) determination of a first direction of the user between the two footsteps towards the at least one transceiver on the basis of said comparison, d) determination of a second direction of the user between the two footsteps, based on an estimation of a first angle of arrival of said signal towards the at least one transceiver through calculation of a phase shift of the received signal between the two antennas, and of a distance between the "hands-free" access equipment and the at least one transceiver,
e) comparison of the first direction and the second direction,
f) activation of the vehicle function on the basis of the result of said comparison.

2. The activation method as claimed in claim 1, further comprising the following steps after the step of determination of a second direction:
   a) calculation of a second angle of arrival for each footstep based on the data of the "hands-free" access equipment and based on the distance between the "hands-free" access equipment and the at least one transceiver,
   b) comparison of said second angle and the first angle,
   c) activation of the vehicle function on the basis of the result of said comparison.

3. The activation method as claimed in claim 2, wherein if the result of the comparison of the first angle and the second angle or of the first direction and the second direction is above a first predetermined angle then no function is activated.

4. The activation method as claimed in claim 2, wherein if the result of the comparison of the first angle and the second angle or of the first direction and the second direction is below a second predetermined angle, which is below the first predetermined angle, then a security function is activated.

5. The activation method as claimed in claim 2, wherein if the result of the comparison of the first angle and the second angle or of the first direction and the second direction is between the second predetermined angle and a third predetermined angle, then a comfort function is activated.

6. The activation method as claimed in claim 2, wherein if the result of the comparison of the first angle and the second angle or of the first direction and the second direction is between the third predetermined angle and the second predetermined angle, then the method is repeated and the values of the first angle and the second angle or of the first direction and the second direction are stored.

7. A non-transitory computer program product comprising program code instructions for executing the steps of the method as claimed in claim 1 when said program is executed on a computer.

8. An activation device for activating a vehicle function, which device is intended to be installed in a vehicle and comprises at least one transceiver capable of using ultra-high frequency to communicate with "hands-free" access equipment carried by a user, the access equipment being equipped with a magnetometer and a gyroscope, the activation of the function being triggered by detection of the presence of the user in a predetermined zone around the vehicle and on the basis of a result of authentication of the "hands-free" access equipment by the vehicle, wherein the at least one transceiver comprises a gyroscope and a magnetometer and two receiving antennas that have a coefficient of electromagnetic coupling between them that is below a threshold, and wherein the device is capable of:
   a) using ultra-high frequency to receive representative data of the gyroscope and the magnetometer from the "hands-free" access equipment,
   b) comparing said data with representative values of the gyroscope and the magnetometer of the at least one transceiver,
   c) determining a first direction of the user on the basis of said comparing said data with the representative values of the gyroscope and the magnetometer of the at least one transceiver,
   d) determining a second direction (of the user, based on an estimation of a first angle of arrival of said signal towards the at least one transceiver through calculation of a phase shift of the received signal between the two antennas and of a distance between the "hands-free" access equipment and the at least one transceiver,
   e) comparing the first direction and the second direction,
   f) activating the vehicle function on the basis of the result of said comparing of the first direction and the second direction.

9. The activation device as claimed in claim 8, wherein the device is capable of:
   a) calculating a second angle of arrival based on the data of the "hands-free" access equipment and based on the distance between the "hands-free" access equipment and the at least one transceiver,
   b) comparing said second angle and the first angle,
   c) activating the vehicle function on the basis of the result of said comparison.

10. An activation system for activating a vehicle function, wherein said activation system comprises an activation device as claimed in claim 8 and "hands-free" access equipment carried by a user, capable of using ultra-high frequency to communicate with the activation device for activating a vehicle function, which device is intended to be installed on a motor vehicle, the "hands-free" access equipment being equipped with a gyroscope and a magnetometer; the activation of the function being triggered by detection of the presence of the user in a predetermined zone around the vehicle and on the basis of a result of authentication of the "hands-free" access equipment by the vehicle, wherein the "hands-free" access equipment is capable of using ultra-high frequency to transmit a signal comprising representative data of the gyroscope and the magnetometer to the vehicle with each footstep, and for at least two consecutive footsteps, of the user.

11. A motor vehicle, wherein said motor vehicle comprises an activation device as claimed in claim 8.

12. A "Hands-free" access equipment carried by a user, capable of using ultra-high frequency to communicate with an activation device for activating a vehicle function, which device is intended to be installed on a motor vehicle, the "hands-free" access equipment being equipped with a gyroscope and a magnetometer; the activation of the function being triggered by detection of the presence of the user in a predetermined zone around the vehicle and on the basis of a result of authentication of the "hands-free" access equipment by the vehicle, wherein the "hands-free" access equipment is capable of using ultra-high frequency to transmit a signal comprising representative data of the gyroscope and the magnetometer to the vehicle with each footstep, and for at least two consecutive footsteps, of the user.

* * * * *

UNITED STATES PATENT AND TRADEMARK OFFICE
CERTIFICATE OF CORRECTION

| | |
|---|---|
| PATENT NO. | : 12,441,274 B2 |
| APPLICATION NO. | : 18/229859 |
| DATED | : October 14, 2025 |
| INVENTOR(S) | : Mohamed Cheikh and Sébastien Chanal |

Page 1 of 1

It is certified that error appears in the above-identified patent and that said Letters Patent is hereby corrected as shown below:

In the Claims

In Column 12, Line 8 in Claim 8, the phrase "direction (of the" should read -- direction of the --.

Signed and Sealed this
Twenty-third Day of December, 2025

John A. Squires
*Director of the United States Patent and Trademark Office*